Sept. 20, 1927.

G. N. PRESA 1,643,030

OPERATING DEVICE FOR AUTOMOBILE HEADLIGHT SHUTTERS

Original Filed May 24, 1926

INVENTOR
Gilberto N. Presa
BY
ATTORNEY

Patented Sept. 20, 1927.

1,643,030

UNITED STATES PATENT OFFICE.

GILBERTO N. PRESA, OF ENNIS, TEXAS, ASSIGNOR OF ONE-TENTH JOINTLY TO GEORGE O. WILSON AND D. C. BIGGERS, OF DALLAS, TEXAS.

OPERATING DEVICE FOR AUTOMOBILE HEADLIGHT SHUTTERS.

Application filed May 24, 1926, Serial No. 111,100. Renewed August 13, 1927.

This invention relates to adjustable shutters for automobile head lights, and has for its object to provide a device of this character which may be set to shut off a portion of the rays from the said lights in such a manner as to illuminate the entire surface of a road, but to leave in shadow the middle and upper portions of an approaching vehicle and thus prevent the dazzling and blinding effect which would ordinarily strike the eyes of the driver of the said vehicle.

Another object is to provide means for holding the said shutters at any desired angle with respect to the vehicle to which they are attached.

These and other objects and advantages will be fully described in the following specification and illustrated in the accompanying drawings, in which.

Figures 5, 6:
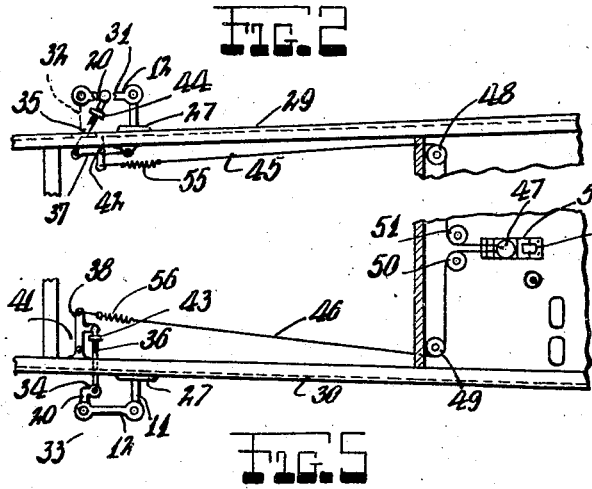

Fig. 5 shows a diagrammatic view of a control apparatus for the operation of the said shutters. In this view, the mechanism is shown mounted on the chassis of an automobile. The lamps and shutters being entirely removed above the line of the horizontal supporting members.

Fig. 6 shows an enlarged side view of the control pedal as used in connection with the said apparatus.

Figures 2, 3, 4:
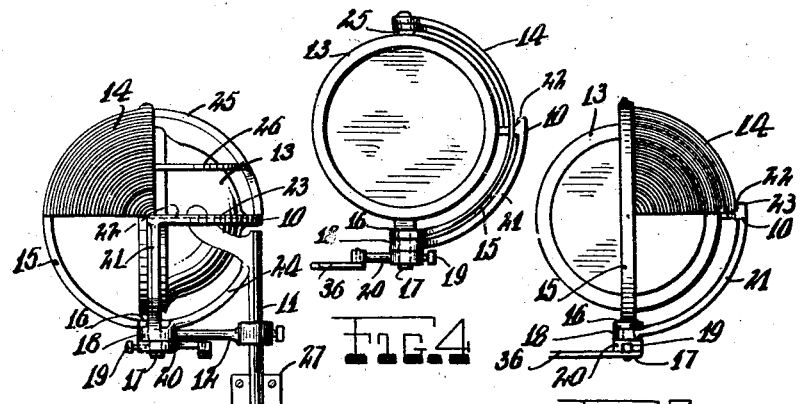
Fig. 2 shows a side view of a lamp with the shutter mounted thereon and set in operative position.
Fig. 3 shows a front view of same.
Fig. 4 shows a front view of the lamp with the shutter turned back and permitting the full exposure of the lense of the said lamp.

The component parts of the invention are as follows:

Referring to Figure 2 of the drawings; a frame 10 is supported on a post 11 by means of a horizontal member 12 and by further attachment of other parts to the said post, or to any suitable bracket which may be provided. This frame 10 partially encircles a lamp 13 of the type in general use on automobiles. The shutter 14 is secured to a semicircular frame member 15 which is pivoted at the top as shown in Figure 4, and has at its lower extremity a flanged portion 16 which has a downward disposed pivot member 17. The flanged portion 16 rests on the base 18 of the supporting frame and the pivot member passes through the said base. Secured to the said pivot by means of the set screw 19 is the crank 20.

Referring again to Figure 2 of the drawings; a side member 21 extends upward from the base 18 and supports the transverse rack 22. The lower edge of the shutter rests upon the said transverse rack and is guided by the rim thereof as seen best in Figure 3. A back frame member 24 extends from the base 18 to the rear supporting structure. A top frame member 25 extends from the rear of its frame structure to the point of pivotal attachment to the member 15. A reinforcing rib 26 strengthens the upper structure of the frame.

The bracket post as shown at 11 may be secured to the chassis of the car by means of the plate 27; or any other suitable means of support may be provided.

In Figures 5 and 6 is illustrated the control mechanism for the device as above described. In the plan view as seen in Figure 5; the brackets 27 are secured to the frame members 29 and 30 of the car chassis. The lamp and shutter mechanism is omitted from this view for the purpose of disclosing the crank members connected to the control mechanism. The horizontal member 12 is cut away at 31, to disclose the crank which is in line with it. The open position of the shutters is indicated in this view in the dotted line 32. The cranks 20, one of which has an offset end as shown at 34, are pivotally attached to the connecting rods 35 and 36 which pass through slots in the chassis frame and are pivoted to the levers 36 and 37 which are secured to the said chassis frame and are retracted by the springs 41 and 42.

On the connecting rods are nuts 43 and 44 which may be adjusted to limit the movements of the said rod by coming into contact with the chassis frame. Cables 45 and 46, which are preferably of stranded wire, are secured to the levers 37 and 38 and connect them with the control pedal 47. These cables extend along the inner side of the car hood back into the body of the car, where they pass around the pulleys 48, 49, 50 and 51 and thence through the frame of the control pedal and over other pulleys as that shown at 52 in Figure 6, and are secured to the base 53 of the plunger 54.

Tension springs 55 and 56 are placed in the said cables at points near to their forward ends.

The control pedal is supported by the frame 57 and is provided with an elevating spring 58. The base piece 53 has an upturned edge 59 which engages the latch 60 when the pedal is depressed. The latch 60 is held in tension by the spring 61 and has its foot piece 62 protruding through the frame 57.

Figure 1:
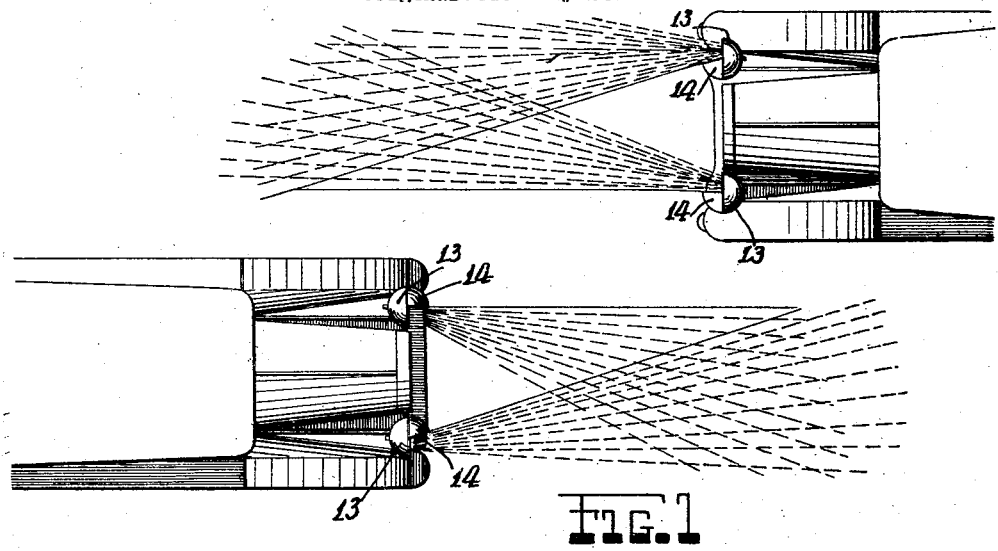
Fig. 1 shows the shutters mounted on two automobiles approaching each other in the usual manner.

Now, referring again to Figure 1 of the drawings; it will be seen that the shutters on the inner, or what may be called the near side, are set so that the rays from the lamps to which they are attached are directed straight ahead on the near side, but radiate to the right hand side of the road; and that the rays from the shutter on the outer, or far side, are set at an angle which, while permitting a certain degree of left hand radiation, spread the rays at a point so far ahead as to have lost their blinding effect.

Now, on reference to Figure 2 of the drawings; it will be seen that the lower half of the lamp is not masked by the shutter at any time, but may cast its rays to right and left in full. The light thus emitted serves to illuminate the lower portions of an approaching car as well as the full surface of the road, but may not rise above the horizontal line of the shutter bottom, and consequently cannot reach the eyes of the approaching driver.

The apparatus as shown may be used either with, or without the control mechanism, as desired. That is the shutters may be mounted without the said control mechanism, and when so used, are set in the desired positions and remain there in continuous operation.

When the control apparatus is installed it is operated as follows: Referring to Figures 5 and 6 of the drawings the shutters rest normally in the positions as indicated at 32 and 33. When a car approaches and the driver wishes to close the shutters he presses down on the pedal 47 which pulls the cables back and through them actuates the levers 37 and 38, which force the cranks 20 to rotate the shutter elements into their forward positions. The pedal is held down by the latch 60, and so remains until released by pressure on the foot piece 62, when the shutters are thrown back and the lamps again fully exposed.

Now, it may be desired to limit the forward movement of the shutters, or to have one come to rest at a different angle than the other. This is done by setting the nuts 43 and 44 so as to stop the movement when the desired angle is reached. When this is done, the tension springs as shown at 55 and 56 elongate to cover the restricted movement, thus avoiding the checking of the movement of the pedal plunger.

While I have shown the preferred embodiment of my invention I do not wish to be limited to the exact construction as illustrated, but claim the right to such minor modifications as may come within the scope of the appended claims.

Having thus described my invention, what I claim as new and desire to secure by Letters Patent, is as follows:

1. In a device of the class described, having cords for operating shutters, the combination of a frame, a control pedal slidable therein, a spring acting between the frame and the pedal normally elevating the pedal, a base piece with an upturned edge secured on the bottom of the pedal, a latch pivoted to a stationary member adjacent the bottom of the frame, the said base piece being engageable with the latch, a spring normally urging the latch into operative position, a foot piece projecting from the latch and protruding from the frame, and a pulley mounted on the frame near the base piece of the pedal when the pedal is in raised position, the said cords passing over the pulley and being attached to the base piece.

2. In a device of the class described, having shutters, the combination of cords for operating the shutters, a frame, a control pedal slidable therein, a spring acting between the frame and the pedal normally elevating the pedal, a base piece with an upturned edge secured on the bottom of the pedal, a latch pivoted to a stationary member adjacent the bottom of the frame, the said base piece being engageable with the latch, a spring normally urging the latch into operative position, a foot piece projecting from the latch and protruding from the frame, and a pulley mounted on the frame near the base piece of the pedal when the pedal is in raised position, the said cords passing over the pulley and being attached to the base piece.

3. In a device of the class described, having shutters, the combination of cords for operating the shutters, a frame, a control pedal slidable therein, a spring normally elevating the pedal, a base piece with an upturned edge secured on the bottom of the pedal, a latch pivoted to a stationary member adjacent the bottom of the frame, the said base piece being engageable with the latch, a spring normally urging the latch into operative position, a foot piece projecting from the latch and protruding from the frame, and a pulley mounted on the frame near the base piece of the pedal when the pedal is in raised position, the said cords passing over the pulley and being attached to the base piece.

4. In a device of the class described, having shutters, the combination of cords for operating the shutters, a frame, a control pedal slidable therein, a spring acting between the frame and the pedal normally elevating the pedal, a base piece with an upturned edge secured on the bottom of the pedal, a latch pivoted to a stationary member adjacent the bottom of the frame, the said base piece being engageable with the latch, a spring acting between the frame and the latch normally urging the latch into operative position, a foot piece projecting from the latch and protruding from the frame, and a pulley mounted on the frame near the base piece of the pedal when the pedal is in raised position, the said cords passing over the pulley and being attached to the base piece.

In testimony whereof I have affixed my signature.

GILBERTO N. PRESA.